April 23, 1963   E. N. MARTIN   3,086,682
HOT LIQUID DISPENSER
Filed Oct. 3, 1960
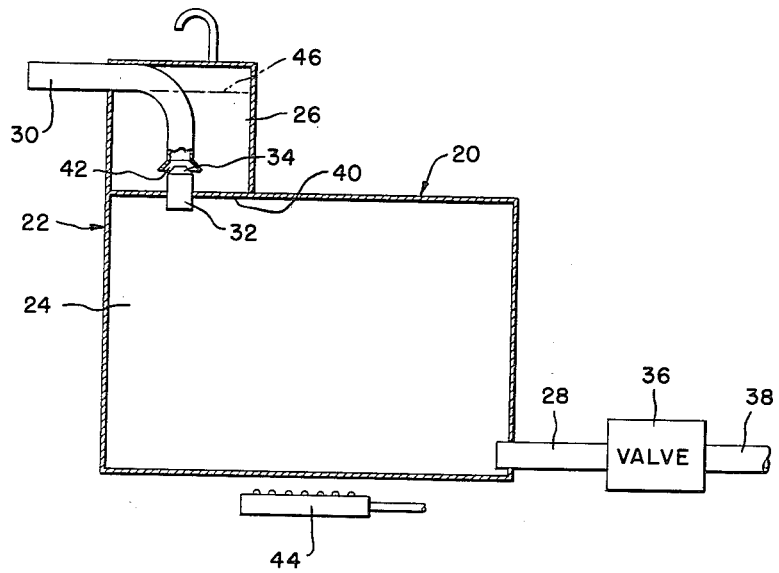
INVENTOR.
ERNEST N. MARTIN
BY
ATTORNEYS

United States Patent Office 3,086,682
Patented Apr. 23, 1963

3,086,682
HOT LIQUID DISPENSER
Ernest N. Martin, 1141 High St., Escondido, Calif.
Filed Oct. 3, 1960, Ser. No. 60,196
3 Claims. (Cl. 222—146)

The present invention relates to hot liquid dispensers and more particularly to the type employing a storage tank under atmospheric pressure and having a heater for the liquid therein.

The dispenser of the present invention includes two reservoirs or tanks which are broadly referred to herein as "tank means" or "tank system." One of these tanks provides the main liquid storage reservoir and the other forms an auxiliary reservoir which is arranged to, at times, supply liquid to the outlet of the tank systems or means when liquid is withdrawn from the main tank, and which is replenished during the time when liquid is not being withdrawn from the tank system.

In carrying out the present invention, the tanks are interconnected below the liquid level. The tank system is open to atmosphere. A liquid outlet determines the high level of liquid and the liquid inlet is below this level. The flow of liquid is controlled by an inlet valve. A nozzle is employed and responds to the flow of liquid from the inlet to the outlet for withdrawing liquid from the auxiliary tank while the inlet valve is open.

In the embodiment illustrated, the auxiliary tank is disposed above the main tank.

The advantages will be apparent from the following description, reference being had to the accompanying drawings wherein a preferred embodiment of the invention is illustrated.

In the drawing:

The FIGURE in the drawing is a schematic view of one form of the invention.

Referring more in detail to the drawing, the hot liquid dispenser 20 comprises tank means 22 in the form of a main liquid storage tank 24 and an auxiliary tank 26. Conduit means, in the form of an inlet pipe 28, an outlet pipe 30, a pipe 32 and a nozzle 34 provides for the flow of liquid through the tank system or tank means. The flow of liquid through the system is controlled by a valve 36, which may be manually operated or controlled by a coin controlled timer (not shown). Liquid is delivered to the valve 36 by a pipe 38, which, for example may be connected to a water main.

When the valve 36 is opened, liquid flows through the inlet pipe 28, the tank 24, pipe 32, nozzle 34 and outlet pipe 30. In this embodiment of the invention, the auxiliary tank 26 is disposed above the main tank 24, the top wall 40 of the tank 24 providing the bottom wall of tank 26. The outlet pipe extends downwardly to below the normal liquid level in auxiliary tank 26 and provides an inlet 42 for the pipe and an outlet for the auxiliary tank. The nozzle 34 is in aspiratory relationship with the inlet 42 for pipe 30, whereby, when liquid is being forced through pipe 32 and nozzle 34, liquid will be withdrawn from the auxiliary tank.

Thus, it will be understood that at the termination of flow of liquid from the tank systems, the liquid level in the auxiliary tank 26 will have dropped from its higher level. During the idle period, i.e., when the valve 36 is closed and no liquid is flowing through the systems, the previously admitted cold liquid will be heated by the heater 44 for the liquid in the main tank. This will cause expansion of the liquid, and as the liquid is being heated gradually, the flow through the pipe 32 and nozzle to the auxiliary tank 26 will be gradual. The capacity of the auxiliary tank below the outlet level 46 is more than sufficient to contain all of the liquid entering the auxiliary chamber during the idle period of the system. Therefore, no liquid will escape through the outlet during the idle period of the system.

It will be apparent that as soon as the valve 36 is closed, liquid will cease to flow through the outlet 30, and consequently there will not be dripping at the outlet. Too, substantially as soon as the valve 36 is opened, liquid is dispensed through the outlet since only a small quantity of air need be displaced in the pipe 30.

Since the flow of liquid is controlled by an inlet valve to the tank system, as distinguished from a pressurized tank system in which the flow of liquid is controlled by an outlet valve, the inherent defects of a valve subjected to hot liquid such as water containing minerals is completely eliminated.

While the form of embodiment herein shown and described constitutes a preferred form, it is to be understood that other forms may be adopted falling within the scope of the claims that follow.

I claim:

1. A hot liquid dispenser, comprising in combination, a main tank; a heater for the tank; means for conducting liquid under pressure to said tank; a valve for controlling the flow of liquid through said means; means forming a conduit having an inlet, said inlet forming the outlet of the tank, said means terminating in a nozzle; means forming an outlet conduit for the liquid to be dispensed; an auxiliary tank, said outlet conduit having an inlet in open communication with the bottom of the auxiliary tank and extending upwardly to define the high liquid level in said auxiliary tank, said auxiliary tank being adapted to receive liquid from the main tank through said nozzle when the liquid expands in the main tank, due to heating thereof, when the valve is closed, the capacity of said auxiliary tank, as established by said outlet conduit, relative to the main tank, being sufficient to contain all liquid entering the same, due to said expansion, when the valve is closed, the nozzle being in aspiratory relationship with the inlet to said outlet conduit for withdrawing liquid from the auxiliary tank when the valve is open.

2. A hot liquid dispenser as defined in claim 1, in which at least part of the auxiliary tank is disposed at a higher level than the main tank.

3. A hot liquid dispenser, comprising in combination, a main tank; a heater for the tank; an auxiliary tank above the main tank, the upper portion of the auxiliary tank forming an air chamber exposed to atmosphere; means forming a conduit for supplying liquid from the main tank to the auxiliary tank; means forming a conduit having the outlet thereof at the level of the air chamber and having the inlet below the air chamber and in open communication with the auxiliary tank, said first mentioned conduit including a nozzle having the inlet thereof connected with the main tank and the outlet in aspiratory relationship with the inlet of the second mentioned conduit; an inlet conduit connected with the main tank; and a valve for controlling the said inlet conduit.

References Cited in the file of this patent

UNITED STATES PATENTS

| | | |
|---|---|---|
| 2,869,760 | Karlen et al. | Jan. 20, 1959 |
| 2,870,318 | Karlen | Jan. 20, 1959 |